(12) United States Patent
Zinn (10) Patent No.: US 10,569,329 B2
(45) Date of Patent: Feb. 25, 2020

(54) METAL NANOPARTICLES FORMED AROUND A NUCLEUS AND SCALABLE PROCESSES FOR PRODUCING SAME

(71) Applicant: Kuprion Inc., San Jose, CA (US)

(72) Inventor: Alfred A. Zinn, Palo Alto, CA (US)

(73) Assignee: Kuprion Inc., San Jose, CA (US)

( * ) Notice: Subject to any disclaimer, the term of this patent is extended or adjusted under 35 U.S.C. 154(b) by 0 days.

(21) Appl. No.: 15/615,739

(22) Filed: Jun. 6, 2017

(65) Prior Publication Data

US 2017/0266724 A1 Sep. 21, 2017

Related U.S. Application Data

(62) Division of application No. 14/028,487, filed on Sep. 16, 2013, now Pat. No. 9,700,940.

(Continued)

(51) Int. Cl.
*B22F 1/00* (2006.01)
*B22F 1/02* (2006.01)
(Continued)

(52) U.S. Cl.
CPC .............. *B22F 1/0007* (2013.01); *B01J 13/02* (2013.01); *B22F 1/0018* (2013.01);
(Continued)

(58) Field of Classification Search
CPC ........................................................ H01B 1/02
See application file for complete search history.

(56) References Cited

U.S. PATENT DOCUMENTS 2,483,075 A 9/1949 Truesdale
4,539,041 A 9/1985 Figlarz et al.
(Continued)

FOREIGN PATENT DOCUMENTS

CN 101007344 A 8/2007
CN 101693297 A 4/2010
(Continued)

OTHER PUBLICATIONS

Bakshi, et al., "Dependence of crystal growth of gold nanoparticles on the capping behavior of surfactant at ambient conditions," Crystal Growth & Design, Mar. 27, 2008, vol. 8, No. 5, pp. 1713-1719.

(Continued)

*Primary Examiner* — William D Young
(74) *Attorney, Agent, or Firm* — Vorys, Sater, Seymour and Pease LLP (57) ABSTRACT

Metal nanoparticles and compositions derived therefrom can be used in a number of different applications. Methods for making metal nanoparticles can include providing a first metal salt in a solvent; converting the first metal salt into an insoluble compound that constitutes a plurality of nanoparticle seeds; and after forming the plurality of nanoparticle seeds, reacting a reducing agent with at least a portion of a second metal salt in the presence of at least one surfactant and the plurality of nanoparticle seeds to form a plurality of metal nanoparticles. Each metal nanoparticle can include a metal shell formed around a nucleus derived from a nanoparticle seed, and the metal shell can include a metal from the second metal salt. The methods can be readily scaled to produce bulk quantities of metal nanoparticles.

4 Claims, 3 Drawing Sheets

Related U.S. Application Data (60) Provisional application No. 61/706,722, filed on Sep. 27, 2012.

(51) Int. Cl.

| | | |
|---|---|---|
| *B22F 9/24* | (2006.01) | |
| *B01J 13/02* | (2006.01) | |
| *B22F 9/18* | (2006.01) | |
| *B82Y 40/00* | (2011.01) | |

(52) U.S. Cl.
CPC ............ *B22F 1/0062* (2013.01); *B22F 1/025* (2013.01); *B22F 9/18* (2013.01); *B22F 9/24* (2013.01); *B82Y 40/00* (2013.01)

(56) References Cited

U.S. PATENT DOCUMENTS

| | | | |
|---|---|---|---|
| 8,105,414 B2* | 1/2012 | Zinn | .................... B22F 1/0018 428/570 |
| 2004/0221685 A1 | 11/2004 | Jeong et al. | |
| 2007/0180954 A1 | 8/2007 | Kim et al. | |
| 2007/0290175 A1 | 12/2007 | Kim | |
| 2008/0157029 A1 | 7/2008 | Lee et al. | |
| 2009/0301344 A1 | 12/2009 | Chretien et al. | |
| 2010/0065616 A1 | 3/2010 | Zinn | |
| 2010/0072434 A1 | 3/2010 | Lee et al. | |
| 2010/0150811 A1 | 6/2010 | Lewis et al. | |
| 2011/0127464 A1* | 6/2011 | Zinn | ..................... B22F 1/0018 252/182.12 |
| 2011/0215279 A1 | 9/2011 | Zinn | |
| 2012/0100374 A1 | 4/2012 | Zinn | |
| 2012/0114521 A1 | 5/2012 | Zinn | |
| 2012/0251381 A1 | 10/2012 | Bedworth et al. | |

FOREIGN PATENT DOCUMENTS

| | | |
|---|---|---|
| EP | 2771492 A2 | 9/2014 |
| JP | 2010-185135 A | 8/2010 |
| JP | 2011177719 A | 9/2011 |
| WO | WO-2012/152740 A2 | 11/2012 |

OTHER PUBLICATIONS

Huaman et al., "Copper nanoparticles synthesized by hydroxyl ion assisted alcohol reduction for conducting ink," J. Mater. Chem., 21 pp. 7062-7069 (Mar. 2011).

Kriek, et al., "Selective and recovery of some platinum group metals (PGMs) by means of selective photocatalytic reduction," The South African Institute of Mining and Metallurgy, Apr. 30, 1995, pp. 75-81.

Liu, et al., "Seed-mediated growth and properties of copper nanoparticles, nanoparticle 1D arrays and nanorods," Microelectronic Engineering, Feb. 7, 2003, vol. 66, No. 1-4, pp. 107-114.

Magdassi, et al., "Copper nanoparticles for printed electronics: routes towards achieving oxidation stability," Materials, Sep. 8, 2010, vol. 3, No. 9, pp. 4626-4638.

Nunes, "A Kinetic Study of the Reduction of Coper (II) by Tin (II) Chloride," Inorganic Chemistry, Jun. 30, 1970, vol. 9, No. 6, pp. 1325-1329.

Wen et al., "Preparation of copper nanoparticles in a water/oleic acid mixed solvent via two-step reduction method," Colloids and Surfaces A: Physicochemical and Engineering Aspects, Oct. 2010, vol. 373, No. 1-3, pp. 29-35.

Xu, et al., "Wet chemical synthesis of gold nanoparticles using silver seeds: a shape control from nanorods to hollow spherical nanoparticles," Nanotechnology, Feb. 7, 2007, vol. 18, No. 11, pp. 115608-1-115608-5.

Larios et al., "Synthesis and Characterization of Bimetallic Copper-Gold Nanoparticles," Journal of Dispersion Science and Technology, Jun. 2016, vol. 33, pp. 719-723.

European Office Action from European Patent Application No. 13841564.1, dated Aug. 2, 2018, 7 pages.

\* cited by examiner

METAL NANOPARTICLES FORMED AROUND A NUCLEUS AND SCALABLE PROCESSES FOR PRODUCING SAME

CROSS-REFERENCE TO RELATED APPLICATIONS

This application is a divisional of U.S. patent application Ser. No. 14/028,487, filed on Sep. 16, 2013, now U.S. Pat. No. 9,700,940, which claims the benefit of priority under 35 U.S.C. § 119 from U.S. Provisional Patent Application 61/706,722, filed Sep. 27, 2012, which is incorporated herein by reference in its entirety.

STATEMENT REGARDING FEDERALLY SPONSORED RESEARCH OR DEVELOPMENT

Not applicable.

FIELD OF THE INVENTION

The present invention generally relates to nanoparticles, and, more specifically, to methods for producing metal nanoparticles in which the nanoparticles are grown around a nucleus that is derived from a plurality of in situ-generated nucleation seeds.

BACKGROUND

Although lead has traditionally been used in numerous industrial applications, current regulations have mandated the elimination and/or phase out of lead in most commercial products. These mandates have stimulated new product development based upon lead-free technologies.

Soldering applications, particularly in electronics and vehicle manufacturing, have been heavily impacted by the ban on lead. Numerous alternatives to traditional lead-based solders have been developed, the Sn/Ag/Cu (SAC) system being among the most widely used, but many have exhibited drawbacks that can make them unsuitable for use in certain applications. For example, SAC solder can be unsuitable for extreme environments such as those found in automotive, military, and space vehicles, where long life and reliability are of significant importance. Furthermore, SAC solder has a significantly higher eutectic melting point (m.p. of ~217° C.) than does traditional Sn/Pb solder (m.p. of 183° C. for 63/37 Sn/Pb or 188° C. for 60/40 Sn/Pb), thus limiting its use to substrates that are capable of withstanding its relatively high processing temperature. The same is also true for many other lead-free solder replacements. The need for high performance, thermally stable substrates for use in conjunction with SAC and other lead solder replacements can significantly impact the cost of consumer products relative to those in which lower quality substrates can be used. Another limitation of SAC solder is that its high tin content makes it prone to tin whisker formation, which can increase the risk of electrical shorting.

Several compositions containing nanoparticles have also been proposed as replacements for traditional lead-based solders. Metal nanoparticles, particularly those that are about 20 nm or less in size, can exhibit a significant melting point depression over that of the corresponding bulk metal, thereby allowing the nanoparticles to be liquefied at temperatures that are often comparable to those of traditional lead-based and lead-free solder materials. Copper nanoparticles, in particular, have been extensively studied as an alternative solder material. Although metal nanoparticles having a widely dispersed size range can be desirable in some instances, it can be more favorable in some applications for the metal nanoparticles to have a narrow, more controlled size range. Although some success has been realized in this regard by using tailored combinations of surfactants during metal nanoparticle growth, scalable processes for reliably producing bulk quantities of metal nanoparticles in a targeted size range are not yet well developed. Without being bound by any theory or mechanism, it is believed that in most metal nanoparticle syntheses, nanoparticle nucleation and growth are competing processes that take place concurrently. That is, as new metal nanoparticles are being formed by a nucleation process, other nanoparticles continue to grow, thereby resulting in a wide nanoparticle size distribution.

In addition to soldering applications, metal nanoparticles have been proposed for use in a number of other fields including, but not limited to, communication, electronic, and medical uses. Production of bulk quantities of metal nanoparticles having a narrow and desired size range remains a challenge for implementing many of these contemplated uses of metal nanoparticles.

In view of the foregoing, scalable processes for producing metal nanoparticles that address current issues relating to nanoparticle size disparity would represent a substantial advance in the art. The present invention satisfies the foregoing need and provides related advantages as well.

SUMMARY

In some embodiments, methods for producing metal nanoparticles are described herein. In some embodiments, the methods include providing a first metal salt in a solvent; converting the first metal salt into an insoluble compound that constitutes a plurality of nanoparticle seeds; and after forming the plurality of nanoparticle seeds, reacting a reducing agent with at least a portion of a second metal salt in the presence of at least one surfactant and the plurality of nanoparticle seeds to form a plurality of metal nanoparticles. Each metal nanoparticle includes a metal shell formed around a nucleus derived from a nanoparticle seed, and the metal shell includes a metal from the second metal salt.

In some embodiments, methods for producing metal nanoparticles can include providing a first metal salt in a solvent, the first metal salt containing a copper (II) salt; reducing the first metal salt to form an insoluble copper (I) compound that constitutes a plurality of nanoparticle seeds; and after forming the plurality of nanoparticle seeds, reacting a reducing agent with a second metal salt in the presence of at least one surfactant and the plurality of nanoparticle seeds to form a plurality of metal nanoparticles. Each metal nanoparticle includes a metal shell formed around a nucleus derived from a nanoparticle seed, and the metal shell includes a metal from the second metal salt.

In some embodiments, methods for producing copper nanoparticles can include providing a copper (II) salt in a solvent; reducing the copper (II) salt to an insoluble copper (I) salt having a particle size of about 10 nm or less; after forming the insoluble copper (I) salt, adding at least one surfactant and a reducing agent thereto; and reacting the reducing agent with the insoluble copper (I) salt in the presence of at least one surfactant to form a plurality of copper nanoparticles.

In some embodiments, metal nanoparticle compositions are described herein. In some embodiments metal nanoparticle compositions can include metal nanoparticles containing a metal shell formed around a nucleus derived from a copper (I) nanoparticle seed, and a surfactant coating disposed on the metal shell, where the surfactant coating includes at least one surfactant.

The foregoing has outlined rather broadly the features of the present disclosure in order that the detailed description that follows can be better understood. Additional features and advantages of the disclosure will be described hereinafter. These and other advantages and features will become more apparent from the following description taken in conjunction with the drawings.

BRIEF DESCRIPTION OF THE DRAWINGS

For a more complete understanding of the present disclosure, and the advantages thereof, reference is now made to the following descriptions to be taken in conjunction with the accompanying drawings describing specific embodiments of the disclosure, wherein.

DETAILED DESCRIPTION

The present disclosure is directed, in part, to methods for producing metal nanoparticles having a nucleus derived from an in situ-generated nucleation seed, which may constitute an insoluble metal compound in some embodiments. The present disclosure is also directed, in part, to metal nanoparticles having a metal shell formed around a nucleus derived from an in situ-generated nucleation seed, which may constitute an insoluble metal compound in some embodiments. The present disclosure is also directed, in part, to metal nanoparticles that are directly produced from an insoluble metal compound that is formed in situ and methods for producing such metal nanoparticles. Other types of nanoparticles can also be produced by extension of the present methods, as described hereinbelow.

Although some success has been realized in developing metal nanoparticle syntheses that are capable of producing a narrow nanoparticle size distribution, such syntheses can sometimes lose their ability to control the nanoparticle size distribution at industrial scales (e.g., hundreds to thousands of liters and higher). This can particularly be the case in syntheses that use tailored surfactants to control metal nanoparticle nucleation and growth. Factors leading to loss of process control can include, for example, temperature fluctuations, mixing gradients, non-uniform nucleation site distribution, local supersaturation effects, and the like. Moreover, the procedures that do exist are not believed to be generally applicable for forming any given type of metal nanoparticle in an intended size range.

In contrast to existing metal nanoparticle syntheses, the present inventor discovered methods in which metal nanoparticle nucleation and growth processes can be simply and effectively separated from one another. By separating metal nanoparticle nucleation and growth from one another, metal nanoparticles having a narrow size distribution within a desired size range can be obtained much more readily, with much less dependence on production scale. Specifically, the methods described herein can produce good yields of metal nanoparticles that have a size of about 20-30 nm or below, particularly with a size of about 10 nm or below, or more particularly with a size of about 5 nm or below. Greater control over the metal nanoparticle size distribution can, in turn, allow the physical and chemical properties of the metal nanoparticles to be more readily tuned to meet the needs of a particular application in which the nanoparticles are being used. Moreover, the methods are readily extendable to the formation of alloy nanoparticles and non-metallic nanoparticles as well.

More particularly, the present inventor determined that seeded growth of metal nanoparticles can be used to accomplish the foregoing. Although seeded growth techniques can sometimes be successful for producing larger particles, such as micron-scale particles, the problem is much more difficult in the nanoscale. In this regard, one has to first make the seeds before nucleating the metal nanoparticles around them, thereby only shifting the nucleation and growth problem to a different reaction than that used to form the metal nanoparticles. Specifically, forming seeds for metal nanoparticle growth (also referred to herein as "nucleation seeds" or "nanoparticle seeds") would ordinarily present the same types of problems that arise with producing metal nanoparticles themselves (i.e., wide size distribution, isolation, and the like). Moreover, in most cases, the nanoparticle seeds are even smaller than the metal nanoparticles themselves. Still further, the separate formation of nanoparticle seeds would ordinarily increase the difficulty and cost associated with producing metal nanoparticles.

The present inventor recognized that certain insoluble salts and other substances stop growing very quickly following their formation from a soluble precursor, thereby producing a narrow distribution of very small particle sizes (e.g., below about 5 nm, particularly about 3 nm or below in size down to molecular clusters that are only about 4-5 atoms in size). The formation of a narrow particle size distribution under these conditions can take place essentially independent of reaction volume, because the insoluble particles form throughout the reaction volume and their limited solubility forces the rapid cessation of particle growth. Following their production, such insoluble substances can serve as an effective template for growth of nanoparticles thereon (i.e., as a nanoparticle seed). Specifically, in some embodiments, a metal nanoparticle having a nucleus derived from a nanoparticle seed can be formed by growing a metal shell around the nucleus. Other types of nanoparticles, such as ceramic nanoparticles, can be grown in a like manner around a nucleus derived from a pre-formed nanoparticle seed. Other illustrative nanoparticles that can be formed by growth from a suitable precursor around a nucleus include those disclosed in commonly owned U.S. Application Publication 20110088739, which is incorporated herein by reference in its entirety. Since the seed-derived nucleus is buried within the metal shell and only constitutes a small volume fraction of the metal nanoparticle as a whole, the presence of the nucleus is not believed to appreciably impact the properties of the metal nanoparticles formed thereon. Thus, by separately producing a plurality of nanoparticle seeds with a narrow size distribution, metal nanoparticles can be produced therefrom in desired size range (e.g., by controlling the nanoparticle growth time) while maintaining a narrow size distribution conferred by the nanoparticle seeds. Illustrative substances that can be readily formed and serve as nanoparticle seeds are discussed in more detail below.

In addition, the present inventor recognized that, in some embodiments, nanoparticle seed formation could readily take place in the same reaction vessel in which metal nanoparticle formation subsequently takes place, thereby not significantly complicating the overall synthetic process. This feature can also limit the exposure of the nanoparticle seeds or the metal nanoparticles to air, which can be favorable in some embodiments. However, in some embodiments, optional separation of the nanoparticle seeds from their formation precursor can take place. The use of nanoparticle seeds in metal nanoparticle syntheses can advantageously allow for metal nanoparticles to be formed from a metal that is the same as or different than that which is present in nanoparticle seeds. In addition, because the nanoparticle seeds constitute but a small fraction of the overall volume of the metal nanoparticles, nanoparticle seeds containing non-metallic elements can be used as well.

Figure 1:
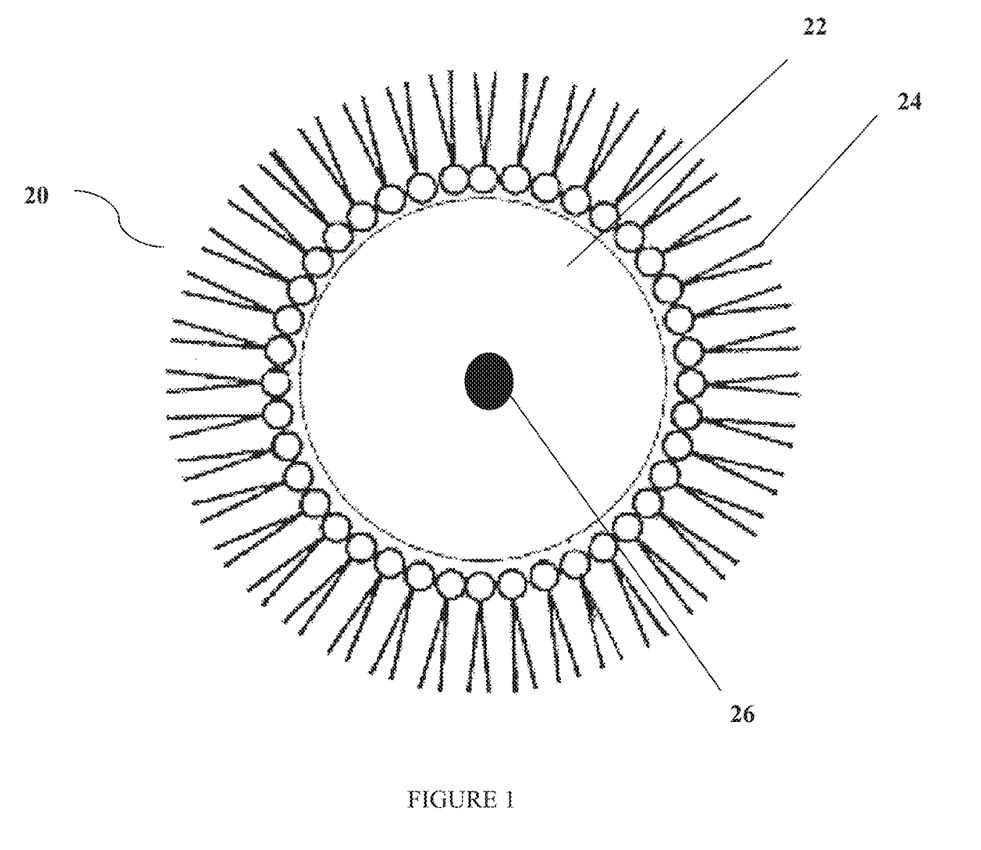
FIG. 1 shows a presumed structure of a metal nanoparticle formed around a nucleus derived from a nanoparticle seed.

Without being bound by any theory or mechanism, FIG. 1 shows a presumed structure of a metal nanoparticle formed around a nucleus derived from a nanoparticle seed. Metal nanoparticle 20 includes metal shell 22 and surfactant coating 24 disposed on metal shell 22. Metal nanoparticle 20 also includes nucleus 26 located within metal shell 22. As described above, nucleus 26 can promote the deposition of metal shell 22 thereon. When nucleus 26 is incorporated within metal nanoparticle 20, it is effectively shielded from its external environment (like the nucleus of an atom) by metal shell 22, and it is not believed to contribute appreciably to the properties of metal nanoparticle 20 as a result.

Although FIG. 1 has depicted metal nanoparticle 20 as having a discernible nucleus 26 surrounded by metal shell 22, this need not necessarily be the case. For example, in the course of forming a metal nanoparticle, the nucleus can become reacted, alloyed, dissolved or otherwise admixed with the metal constituting the metal shell. The nature of the nanoparticle seed and the chosen metal will determine whether or not the nanoparticle seed remains as a discrete entity in the metal nanoparticles.

Moreover, the embodiments of the present disclosure are not necessarily limited to the formation of metal nanoparticles around a nanoparticle seed. Other types of nanoparticles can be formed through variation of the methods described herein. Illustrative nanoparticles that can be formed through extension of the methods described herein include, for example, alloy nanoparticles containing two or more metals, LaTe alloy nanoparticles, periodic Group III/V nanoparticles, periodic Group II/VI nanoparticles, carbide nanoparticles, nitride nanoparticles, oxide nanoparticles, boride nanoparticles, chalcogenide nanoparticles, and pnictide nanoparticles.

As used herein, the term "nanoparticles" refers to particles having a size of about 100 nm or less in equivalent spherical diameter, although nanoparticles need not necessarily be spherical in shape. As used herein, the term "metal nanoparticles" refers to nanoparticles having a metal-containing shell formed around a nucleus, in which the shell contains one or more metals, although the one or more metals need not necessarily be in a zero-valent state. Reference to a particular type of metal nanoparticle will refer to the metal that is present in its metal shell. For example, the term "copper nanoparticles" refers to metal nanoparticles having a copper-containing shell formed around a nucleus.

As used herein, the term "size range" refers to the distribution of nanoparticle sizes in a plurality of nanoparticles, such that >95% of the nanoparticles have a size residing within the indicated size range.

As used herein, the term "average size" refers to the arithmetic mean of the distribution of nanoparticle sizes in a plurality of nanoparticles.

As used herein, the term "maximum size" refers to the largest nanoparticle size in a plurality of nanoparticles.

As used herein, the term "fusion temperature" refers to the temperature at which nanoparticles liquefy and fuse to one another, giving the appearance of melting. As used herein, the terms "fuse," "fused," "fusion," and other variants thereof refer to a coalescence or partial coalescence between two or more nanoparticles.

As used herein, the term "organic solvent" generally refers to polar aprotic organic solvents. Organic solvents of the embodiments described herein are capable of solubilizing metal salts and/or reducing agents, or acting as co-solvents to solubilize metal salts and/or reducing agents. Suitable organic solvents can include, but are not limited to, alcohol and glycol solvents, which can also be used in combination with water.

As used herein, the term "insoluble compound" refers to a substance that forms as a precipitate, colloid, or sol from a soluble precursor in a given solvent.

In some embodiments, methods described herein can include providing a first metal salt in a solvent; converting the first metal salt into an insoluble compound that constitutes a plurality of nanoparticle seeds; and after forming the plurality of nanoparticle seeds, reacting a reducing agent with at least a portion of a second metal salt in the presence of at least one surfactant and the plurality of nanoparticle seeds to form a plurality of metal nanoparticles. Each metal nanoparticle includes a metal shell formed around a nucleus derived from a nanoparticle seed, and the metal shell includes a metal from the second metal salt.

A wide variety of insoluble compounds are contemplated to be readily formed from a soluble precursor in an appropriate solvent and utilized in the formation of metal nanoparticles in accordance with the embodiments described herein. Illustrative examples of suitable insoluble compounds and techniques for their formation are described in more detail hereinafter. As will be recognized by one having ordinary skill in the art, the solubility of a particular compound will often be dictated by the solvent in which a soluble precursor to the insoluble compound is present. By knowing the general solubility of compounds in particular solvents, one of ordinary skill in the art will be able to choose a suitable solvent from which to form an insoluble compound that constitutes a plurality of nanoparticle seeds and also from which to subsequently grow metal nanoparticles therefrom.

In some embodiments, the insoluble compound can be formed by reducing the first metal salt to form an insoluble compound. Some measure of size control of the nanoparticle seeds in the insoluble compound can be realized by modulating the reduction temperature and the length of time the reaction mixture is stirred following the initial reduction, although the size distribution is thought to be largely due to the innate solubility of the nanoparticle seeds in the chosen solvent. In more particular embodiments, the first metal salt can be reduced by a first portion of the second metal salt to form the insoluble compound. Specifically, in some embodiments, the methods described herein can employ an internal oxidation-reduction reaction that takes place between the first metal salt and the second metal salt to form the insoluble compound. In such embodiments, the second metal salt is oxidizable and the first metal salt is reduced by the second metal salt to form the insoluble compound. The insoluble compound can be a zero-valent metal or an insoluble metal salt that contains a metal from the first metal salt. The insoluble compound can constitute a plurality of nanoparticle seeds upon which metal nanoparticles can be grown subsequently. In some embodiments, the metal nanoparticles can be grown by reacting the remaining second metal salt and/or an oxidation product of the second metal salt with a reducing agent in the presence of at least one surfactant, or a different metal salt entirety (i.e., a third metal salt) can be reacted with the reducing agent to form the metal nanoparticles.

In other embodiments, the first metal salt can be reduced by a third metal salt to form the insoluble compound. In such embodiments, the metal nanoparticles can again be formed from the second metal salt. In some embodiments, the metal from the third metal salt does not become incorporated in the metal nanoparticles. Keeping the metal from the third metal salt from becoming incorporated in the metal nanoparticles can be accomplished by choosing the third metal salt so that it does not become reduced to a zero-valent metal for forming a metal shell, or by separating the insoluble compound from the third metal salt or its oxidation product before forming the metal nanoparticles. In some embodiments, the methods described herein can further include separating the insoluble compound from the third metal salt or an oxidation product thereof, prior to reacting the reducing agent with the second metal salt. It is to be recognized that in other embodiments described herein, it can also sometimes be desirable to separate the insoluble compound prior to forming metal nanoparticles therefrom.

In still other embodiments, the first metal salt can be reduced by a sugar containing an oxidizable group in order to form the insoluble compound. That is, in such embodiments, the first metal salt can be reduced with a reducing sugar to form the insoluble compound. The structure of reducing sugars and suitable examples thereof will be familiar to one having ordinary skill in the art.

In some embodiments, at least the first metal salt can be a copper (II) salt, and the insoluble compound can be a copper (I) salt. Copper (II) salts are soluble in a wide range of solvents. Suitable copper (II) salts are not believed to be particularly limited and can include, for example, copper (II) chloride, copper (II) sulfate, copper (II) acetate, copper (II) nitrate, and the like. Oxidizable metal salts, reducing sugars and other mild reducing agents readily reduce copper (II) to form copper (I). Unlike copper (II) salts, copper (I) salts are extremely insoluble in all common solvents, and the copper (I) salts can precipitate as a very finely divided insoluble compound that can constitute a plurality of nanoparticle seeds. The reductant that brought about the formation of the copper (I) salt can, in contrast, remain soluble in the solvent. In some embodiments, the first metal salt can be a copper (II) salt, and the second metal salt can be a metal salt that contains a different metal. In such embodiments, the methods described herein can produce hybrid metal nanoparticles having a nucleus that contains copper and a metal shell that contains another metal. As described above, such hybrid metal nanoparticles can manifest only the properties of the metal shell, as if the nucleus was not present. In other embodiments, both the first metal salt and the second metal salt can be a copper (II) salt. Accordingly, in such embodiments, the metal shell and the nucleus can both contain the same metal, copper.

In addition to the copper nanoparticles described above, other illustrative metal nanoparticles that can be formed using an insoluble copper (I) salt as a plurality of nanoparticle seeds are tin nanoparticles. Reactions that can be associated with forming tin nanoparticles in this manner are summarized in Formulas (1-3) below. In Formula (3), designation of the $Cu_{nano}$ in parentheses indicates that it is located as the nucleus of the tin nanoparticles so obtained.

The initially formed $Cu^+_{nano}$ can be reduced in situ to copper (0) during reduction to form the tin nanoparticles around a copper nucleus. Other metal nanoparticles can be formed in a like manner, as discussed in more detail below.

$$Sn^{2+} \rightarrow Sn^{4+} + 2e^-$$ Formula (1)

$$2Cu^{2+} + 2e^- \rightarrow 2Cu^+_{nano}$$ Formula (2)

$$Sn^{2+}/Sn^{4+} + \text{reducing agent} + Cu^+_{nano} \rightarrow Sn_{nano}(Cu_{nano})$$ Formula (3)

Figure 2:
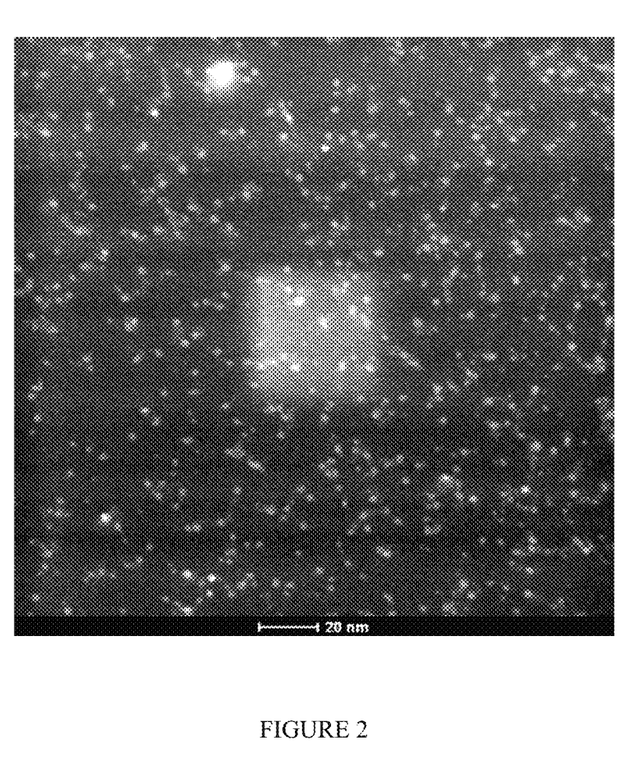
FIG. 2 shows an illustrative STEM image on a gold TEM grid of copper (I) chloride nanoparticle seeds prepared via reduction of a copper (II) salt.
Figure 3A:
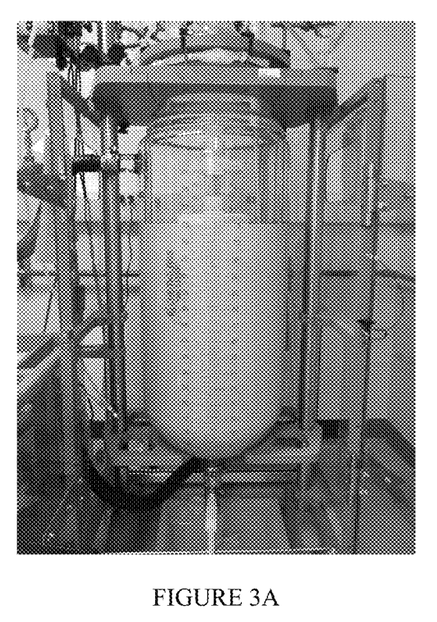
FIGS. 3A and 3B show photographs of a 100 L reactor used in forming metal nanoparticles at the nanoparticle seed stage (FIG. 3A) and after forming metal nanoparticles (FIG. 3B).
Figure 3B:
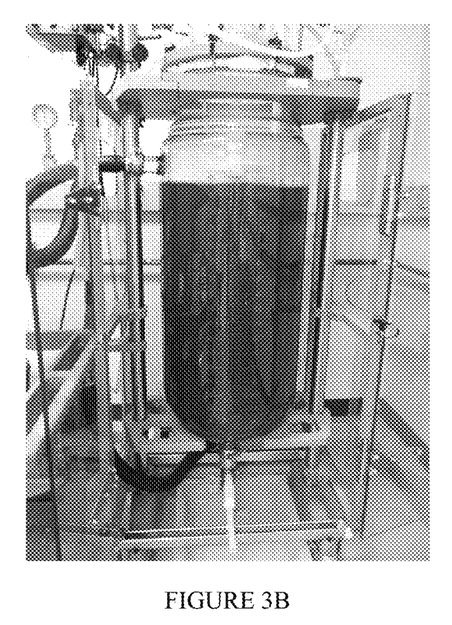

FIG. 2 shows an illustrative STEM image on a gold TEM grid of copper (I) chloride nanoparticle seeds prepared via reduction of a copper (II) salt. The copper (I) chloride nanoparticle seeds range in size from 3-6 nm. FIG. 3A shows a photograph of a 100 L reactor used in forming metal nanoparticles at the nanoparticle seed stage, and FIG. 3B shows the different appearance of the reactor contents after forming metal nanoparticles.

Other examples of oxidizable metal salts that can be used as the second metal salt for purposes of reducing the first metal salt to form an insoluble compound can include, for example, $Fe^{2+}$ salts, $Ti^{3+}$ salts, $Ce^{3+}$ salts, and the like. The reactions of these ions as their chloride salts are set forth in Formulas (4)-(6). The residual second metal salt (e.g., in the form of $Fe^{2+}/Fe^{3+}$, $Ti^{3+}/Ti^{4+}$ or $Ce^{3+}/Ce^{4+}$) can subsequently be converted to iron nanoparticles, titanium nanoparticles or cerium nanoparticles, respectively, each having a nucleus derived from an insoluble copper (I) salt. These oxidizable metal salts and others can also be used as a third metal salt in a like manner to that described above.

$$CuCl_2 + FeCl_2 \rightarrow FeCl_3 + CuCl_{nano}$$ (Formula 4)

$$CuCl_2 + TiCl_3 \rightarrow TiCl_4 + CuCl_{nano}$$ (Formula 5)

$$CuCl_2 + CeCl_3 \rightarrow CeCl_4 + CuCl_{nano}$$ (Formula 6)

Other oxidizable metal salts that are capable of reducing copper (II) to copper (I) can be used in a like manner as the second metal salt. One of ordinary skill in the art will be able to determine suitable examples of such oxidizable metal salts through having the benefit of this disclosure and by referring to a table of standard oxidation/reduction potentials and the known solubility properties of the metal salts.

In some embodiments, nanoparticle seeds containing copper (I) can also be generated from basic copper (II) solutions that are stabilized with ammonia, citrate, or tartrate, for example. The addition of a reducing sugar or other readily oxidizable compound, particularly one that contains one or more aldehyde functional groups, can reduce copper (II) to insoluble $Cu_2O$ that precipitates as a very fine yellow material that then turns red. The $Cu_2O$ so formed can be used in the formation of metal nanoparticles in a like manner to that described above for CuCl and other insoluble copper (I) salts. The reaction to produce $Cu_2O$ in the foregoing manner is shown in Formula 7.

$$2Cu(OH)_2 + C_6H_{12}O_6 \rightarrow Cu_2O_{nano} + C_6H_{12}O_7 + 2H_2O$$ (Formula 7)

In the foregoing embodiments, the first metal salt is not limited to just a copper (II) salt. In general, any first metal salt that forms a highly insoluble compound upon reduction can be used in various embodiments of the present disclosure. Other first metal salts that can form insoluble compounds following reduction (e.g., with tin (II)) include, for example, iron (III) salts. For example, iron (II) nanoparticle seeds can be produced by reduction of an iron (III) salt in a solvent like triglyme.

The first metal salt also need not necessarily be reduced by a second metal salt in order to form an insoluble compound. As described above, in some embodiments, a reducing sugar can be used to convert the first metal salt into the insoluble compound. Likewise, in other alternative embodiments, the first metal salt can be reduced using an organic compound containing an oxidizable group or using an inorganic reducing agent. These types of compounds can remain soluble in the solvent after forming the insoluble compound and subsequent reduction of the second metal salt to form the metal nanoparticles. In still other alternative embodiments, the first metal salt can be reduced with a third metal salt. In some embodiments, the third metal salt can be reacted with the first metal salt to form the insoluble compound in the absence of the second metal salt. The insoluble compound can then be separated from the third metal salt or its oxidation product and subsequently combined with the second metal salt, which can then be reacted with a reducing agent to form the metal nanoparticles. Alternative strategies for forming the insoluble compound from the first metal salt through routes other than reduction are discussed in more detail below.

In some embodiments, nanoparticle seeds formed through reduction of the first metal salt can have a metal oxidation state of +1 or above after being reduced, particularly through reduction using a second metal salt or a third metal salt. As discussed above, the reduction of copper (II) to copper (I) represents an illustrative example. In other embodiments, the nanoparticle seeds can have a metal oxidation state of 0 after being reduced. Illustrative metal ions that can be reduced to zero-valent nanoparticle seeds in the foregoing manner include, for example, gold and silver ions, for example. Suitable silver (I) and gold (III) salts that can be used to form zero-valent nanoparticle seeds include, for example, silver (I) nitrate and gold (III) chloride. Auric acid ($HAuCl_4$) can also be used in a similar manner. Compared to copper salts, however, the latter metals are extremely expensive and not well suited for large scale production of metal nanoparticles as a result.

In alternative embodiments, the first metal salt need not be reduced, by a second metal salt or otherwise, in order to form an insoluble compound that can constitute a plurality of nanoparticle seeds. A number of approaches can be used to rapidly form insoluble compounds from a first metal salt, whose particles stop growing rapidly and accordingly have a narrow particle size distribution. Several of these approaches for forming nanoparticle seeds are discussed below.

In some embodiments, a soluble first metal salt can be reacted with an agent that results in precipitation of an insoluble salt containing the metal cation of the first metal salt. As referenced above, one of ordinary skill in the art will be able to determine the solubility of a particular metal salt by referencing a table of known metal salt solubility properties. A number of metal salts of organic acids (i.e., metal carboxylates) are insoluble. Illustrative examples of metal carboxylates that can be suitable as nanoparticle seeds include, for example, metal benzoates and metal oxalates. For example, highly insoluble silver benzoate can be formed by reacting silver nitrate with benzoic acid, and calcium oxalate can be formed by reacting calcium chloride with oxalic acid. In other embodiments, the first metal salt can be reacted to produce a metal sulfide. One of ordinary skill in the art will recognize that many metal sulfides, particularly transition metal sulfides, are highly insoluble and can be prepared as finely divided precipitates by reacting a soluble salt with hydrogen sulfide or a hydrogen sulfide-generating compound.

In still other embodiments, a soluble first metal salt can be reacted with a ligand that results in precipitation of an insoluble metal-ligand complex containing the metal cation of the first metal salt. For example, in some embodiments, a metal-salen complex can be used as the insoluble compound constituting the nanoparticle seeds (salen=condensation product of salicylaldehyde and ethylenediamine, or a derivative of either of these compounds). One of ordinary skill in the art will recognize that many salen complexes are highly insoluble and form finely divided precipitates. Insoluble metal complexes can also be formed from other ligands or combinations of ligands and can also be used in other embodiments of the present disclosure.

In still other alternative embodiments, sols can be used to form the insoluble compound of the plurality of nanoparticle seeds. Suitable sols can include, for example, silica sols and tin (IV) oxide sols. Although silica sols are typically formed from covalent silicon tetraalkoxy compounds, for the purposes of this disclosure, these types of compounds will be considered to constitute a metal salt. Hydroxide sols can also be used in some embodiments described herein. An advantage of certain hydroxide sols is that as they age, their particle size changes, thereby offering some degree of tunability to the nanoparticle seed size. Suitable hydroxide sols can include, for example, $Fe(OH)_3$, $Al(OH)_3$, and Mo/W hydroxide sols. In still other embodiments, insoluble sols can be formed from bidentate ligands that cannot bond to a single metal center due to steric hindrance, such that bridging structures are instead formed.

In some embodiments, the insoluble compound constituting the plurality of nanoparticle seeds can constitute colloidal sulfur. Colloidal sulfur can be formed by the metathesis reaction between sodium sulfide and strontium chloride in water or methanol as a solvent, for example. In still further alternative embodiments, periodic Group II carbonates or sulfates, for example, can be precipitated from water as insoluble nanoparticle seeds. For example, in some embodiments, $CaCO_3$ or $CaSO_4$ can be precipitated from water as a very fine suspension having a milky appearance. Similarly, in some embodiments, $HgI_2$, $CdI_2$, or $BiCl_3$ can be reacted with $Na_2Te$ to form the respective tellurides or selenides as the insoluble nanoparticle seeds. Concentration and temperature can be used to control the size of the nanoparticle seeds to some degree.

Accordingly, in view of the foregoing, it is believed that metal nanoparticles having any metal in the metal shell formed around the nucleus can be produced through appropriate modifications of the methods described herein. In this regard, illustrative metals that can be present in the metal shell produced from the second metal salt and formed by the methods described herein include transition metals (Sc, Ti, V, Cr, Mn, Fe, Co, Ni, Cu, Zn, Y, Zr, Nb, Mo, Ru, Rh, Pd, Ag, Cd, Hf, Ta, W, Re, Os, Ir, Pt, Au), main group metals (e.g., Al, Ga, In, Tl, Sn, Pb, Sb, Bi), and lanthanide metals (La, Ce, Pr, Nd, Sm, Eu, Gd, Tb, Dy, Ho, Er, Tm, Yb, Lu). In some embodiments, the second metal salt can constitute a mixture of metal salts of any two or more of the foregoing metals, such that the metal shell is an alloy and alloy nanoparticles are formed. Any salt form of these elements that is soluble in the chosen solvent can be used as the second metal salt for purposes of forming the metal shell of the metal nanoparticles. Moreover, the metal that is present in the metal shell of the metal nanoparticles can be the same as or different than that which is present in the nucleus derived from the nanoparticle seed. That is, in some embodiments, the first metal salt and the second metal salt can be the same, and in other embodiments, the first metal salt and the second metal salt can be different. Further, in view of the above description regarding the nanoparticle seeds, it is to be recognized that a metal shell can be formed around a nanoparticle seed that is non-metallic but is formed from a first metal salt (e.g., colloidal sulfur).

In more particular embodiments, methods described herein can include providing a first metal salt in a solvent, the first metal salt including a copper (II) salt; reducing the first metal salt to form an insoluble copper (I) compound, the insoluble copper (I) compound constituting a plurality of nanoparticle seeds; and after forming the plurality of nanoparticle seeds, reacting a reducing agent with a second metal salt in the presence of at least one surfactant and the plurality of nanoparticle seeds to form a plurality of metal nanoparticles, each metal nanoparticle containing a metal shell formed around a nucleus derived from a nanoparticle seed, and in which the metal shell contains a metal from the second metal salt.

In some embodiments, the first metal salt containing the copper (II) salt can be reduced by a first portion of the second metal salt. In such embodiments, the first metal salt and the second metal salt are different. Accordingly, in such embodiments, the metal nanoparticles can have a metal shell that contains a different metal than the copper which is present in the nucleus of the metal nanoparticles.

In other embodiments, the first metal salt containing the copper (II) salt can be reduced by a third metal salt. In some embodiments, the methods can further include separating the insoluble copper (I) compound from the third metal salt or an oxidation product thereof, prior to reacting the reducing agent with the second metal salt to form the plurality of metal nanoparticles. In some embodiments, the methods can further include combining the second metal salt with the nanoparticle seeds, after separating the nanoparticle seeds from the third metal salt or an oxidation product thereof. In such embodiments, the metal shell can contain a metal that is the same as or different than the copper that is present in the nucleus of the metal nanoparticles. That is, in some embodiments, the second metal salt can be a copper (II) salt.

Since the nucleus around which the metal nanoparticles are formed constitutes but a small percentage of the overall nanoparticle volume, the first metal salt is generally present in a lesser amount relative to the second metal salt. By adjusting the amount of the second metal salt that is present and other factors, the thickness of the metal shell of the metal nanoparticles can be controlled, thereby dictating the overall size of the metal nanoparticles, since the nucleus derived from the nanoparticle seeds is relatively invariant in size. In some embodiments, the first metal salt is present in an amount ranging between about 0.01 and about 0.5 stoichiometric equivalents relative to the second metal salt. In other embodiments, the first metal salt is present in an amount ranging between about 0.05 and about 0.25 stoichiometric equivalents relative to the second metal salt, or in an amount ranging between about 0.05 and about 0.1 stoichiometric equivalents relative to the second metal salt, or in an amount ranging between about 0.1 and about 0.15 stoichiometric equivalents relative to the second metal salt, or in an amount ranging between about 0.15 and about 0.2 stoichiometric equivalents relative to the second metal salt, or in an amount ranging between about 0.2 and about 0.25 stoichiometric equivalents relative to the second metal salt. In more specific embodiments, a stoichiometric ratio of the first metal salt to the second metal salt can be about 0.01, or about 0.02, or about 0.03, or about 0.04, or about 0.05, or about 0.06, or about 0.07, or about 0.08, or about 0.09, or about 0.1, or about 0.11, or about 0.12, or about 0.13, or about 0.14, or about 0.15, or about 0.16, or about 0.17, or about 0.18, or about 0.19, or about 0.20, or about 0.21, or about 0.22, or about 0.23, or about 0.24, or about 0.25.

In some embodiments, metal nanoparticles produced by the methods described herein can range from about 1 nm to about 20-30 nm in size. In some or other embodiments, the metal nanoparticles can range between about 1 nm to about 5 nm in size, or between about 1 nm to about 10 nm in size, or between about 5 nm to about 10 nm in size, or between about 10 nm to about 15 nm in size, or between about 15 nm to about 20 nm in size, or between about 20 nm to about 25 nm in size, or any subrange or combination of these ranges. In some embodiments, the metal nanoparticles can have a size distribution ranging between about 3 nm and about 5 nm, which is close to monodispersity.

As discussed above, metal nanoparticles formed by the methods described herein can have a surfactant coating disposed on the metal shell formed around the nucleus, in which the surfactant coating contains at least one surfactant. The at least one surfactant can be physically bonded to the metal shell, chemically bonded to the metal shell or any combination thereof. The inclusion of one or more surfactants during the synthesis of the metal nanoparticles can result in their stabilization and even further limit growth of metal nanoparticles to a desired size. Among other features, stabilization of the metal nanoparticles using one or more surfactants can include, for example, preventing or limiting agglomeration of the metal nanoparticles, controlling the size of the metal nanoparticles, protecting the surface of the metal nanoparticles from oxidation, or any combination thereof.

In some embodiments, one surfactant can be included in the synthesis of the metal nanoparticles and become disposed on the metal shell. In other embodiments, two or more surfactants can be included in the synthesis of the metal nanoparticles and become disposed on the metal shell. In some embodiments, three or more surfactants can be included in the synthesis of the metal nanoparticles and become disposed on the metal shell. By using mixtures of surfactants, the properties of the metal nanoparticles can be further tailored. For example, some surfactants will interact more strongly with certain metals than with others, thereby requiring more vigorous conditions, such as heating, to remove the surfactant(s) from the metal nanoparticles. Further discussion of suitable surfactants and benefits of using mixtures of surfactants in combination with one another will be discussed hereinbelow. A brief discussion of illustrative surfactants that interact strongly with particular metals will also be provided below.

In some embodiments, a combination of amine surfactants, particularly aliphatic amines, can be used during the synthesis of metal nanoparticles and become disposed on the metal shell of the metal nanoparticles. In some embodiments, two amine surfactants can be used in combination with one another. In other embodiments, three amine surfactants can be used in combination with one another. In more specific embodiments, a primary amine and a diamine chelating agent can be used in combination with one another, or a primary amine, a secondary amine, and a diamine chelating agent can be used in combination with one another. In still more specific embodiments, the three amine surfactants can include a long chain primary amine, a secondary amine, and a diamine having at least one tertiary alkyl group nitrogen substituent. In some or other embodiments, triamines, tetraamines, or ethylenediaminetetraacetic acid can be used as an amine surfactant during the formation of metal nanoparticles, optionally in combination with the other surfactants described herein. Such multidentate surfactants can be desirable for forming three-dimensional networks, such as sols, in some embodiments. Azodicarboxamides can also be used in a similar manner in some embodiments. Further disclosure regarding suitable amine surfactants follows hereinafter.

In some embodiments, the at least one surfactant can include a primary alkylamine. In some embodiments, the primary alkylamine can be a C4-C18 alkylamine, or a C6-C18 primary alkylamine. In some embodiments, the primary alkylamine can be a C7-C10 alkylamine. In other embodiments, a C5-C6 primary alkylamine can also be used. Without being bound by any theory or mechanism, the exact size of the primary alkylamine can be balanced between being long enough to provide an effective inverse micelle structure versus having ready volatility and/or ease of handling. For example, primary alkylamines with more than 18 carbons can also be suitable for use in the present embodiments, but they can be more difficult to handle because of their waxy character. C7-C10 primary alkylamines, in particular, can represent a good balance of desired properties for ease of use.

In some embodiments, the C4-C18 primary alkylamine can be n-heptylamine, n-octylamine, n-nonylamine, or n-decylamine, for example. While these are all straight chain primary alkylamines, branched chain primary alkylamines can also be used in other embodiments. For example, branched chain primary alkylamines such as, for example, 7-methyloctylamine, 2-methyloctylamine, or 7-methylnonylamine can be used. In some embodiments, such branched chain primary alkylamines can be sterically hindered where they are attached to the amine nitrogen atom. Non-limiting examples of such sterically hindered primary alkylamines can include, for example, t-octylamine, 2-methylpentan-2-amine, 2-methylhexan-2-amine, 2-methylheptan-2-amine, 3-ethyloctan-3-amine, 3-ethylheptan-3-amine, 3-ethylhexan-3-amine, and the like. Additional branching can also be present. Without being bound by any theory or mechanism, it is believed that primary alkylamines can serve as ligands in the coordination sphere of the metal shell. Due to their single point of attachment, they are believed to be readily dissociable from the metal shell, particularly under heating conditions. For example, during metal nanoparticle fusion, the primary alkyl amines and/or other surfactants can dissociate from the metal shell as the nanoparticles become fused together. For primary alkylamines having significant steric hinderance, the bulky groups near the amine nitrogen atom can further reduce the bonding strength and facilitate dissociation from the metal shell.

In some embodiments, the at least one surfactant can include a secondary amine, particularly a secondary aliphatic amine. Secondary amines suitable for use in the present embodiments can include normal, branched, or cyclic C4-C12 alkyl groups bound to the amine nitrogen atom. In some embodiments, the branching can occur on a carbon atom bound to the amine nitrogen atom, thereby producing significant steric encumbrance at the nitrogen atom. Secondary amines that can be used in the synthesis of metal nanoparticles and can become disposed on the metal shell include, without limitation, dihexylamine, diisobutylamine, di-t-butylamine, dineopentylamine, di-t-pentylamine, dicyclopentylamine, dicyclohexylamine, and the like. Secondary amines outside the C4-C12 range can also be used, but such secondary amines can have undesirable physical properties such as low boiling points or waxy consistencies that complicate their handling. Without being bound by any theory or mechanism, it is believed that secondary amines can more strongly coordinate to the metal shell due to their higher basicity, although the bonding strength can be tempered when the secondary amine is sterically encumbered. Remaining unbound by any theory or mechanism, it is believed that secondary amines can particularly facilitate the dissolution of metal salts in an organic solvent.

In some embodiments, the at least one surfactant can include a chelating agent, particularly a diamine chelating agent. In some embodiments, one or both of the nitrogen atoms of the diamine chelating agent can be substituted with one or two alkyl groups each. When two alkyl groups are present on the same nitrogen atom, they can be the same or different. Further, when both nitrogen atoms are substituted, the same or different alkyl groups can be present. In some embodiments, the alkyl groups can be C1-C6 alkyl groups. In other embodiments, the alkyl groups can be C1-C4 alkyl groups or C3-C6 alkyl groups. In some embodiments, C3 or higher alkyl groups can be straight or have branched chains. In some embodiments, C3 or higher alkyl groups can be cyclic. Without being bound by any theory or mechanism, it is believed that diamine chelating agents can coordinate a metal center at two locations and stabilize the formation of metal nanoparticles. Formation of a metal chelate can result in the diamine chelating agent being more strongly bound to the metal shell than are non-chelated surfactants. It is to be recognized, however, that a diamine chelating agent also bridge between two metal nanoparticles in some embodiments.

In some embodiments, suitable diamine chelating agents can include N,N'-dialkylethylenediamines, particularly C1-C4 N,N'-dialkylethylenediamines. The corresponding methylenediamine, propylenediamine, butylenediamine, pentylenediamine or hexylenediamine analogues can also be used. The alkyl groups can be the same or different. C1-C4 alkyl groups that can be present include, for example, methyl, ethyl, propyl, and butyl groups, or branched alkyl groups such as isopropyl, isobutyl, s-butyl, and t-butyl groups. Illustrative N,N'-dialkylethylenediamines that can be suitable for use in the present embodiments include, for example, N,N'-dimethylethylenediamine, N,N'-diethyl ethylene diamine, N,N'-di-t-butylethylenediamine, N,N'-diisopropylethylenediamine, and the like.

In some embodiments, suitable diamine chelating agents can include N,N,N',N'-tetraalkylethylenediamines, particularly C1-C4 N,N,N',N'-tetraalkylethylenediamines. The corresponding methylenediamine, propylenediamine, butylenediamine, pentylenediamine or hexylenediamine analogues can also be used. The alkyl groups can again be the same or different and include those mentioned above. Illustrative N,N,N',N'-tetraalkylethylenediamines that can be suitable for use in the present embodiments include, for example, N,N,N',N'-tetramethylethylenediamine, N,N,N',N'-tetraethylethylenediamine, and the like.

Surfactants other than amines, particularly aliphatic amines, can also be used in the embodiments described herein. Illustrative examples of suitable surfactants that can be used in this regard include, for example, pyridines, aromatic amines, phosphines, thiols, and any combination thereof. These surfactants can be used in combination with an aliphatic amine, including those described above, or they can be used in a surfactant system in which an aliphatic amine is not present.

Suitable aromatic amines can have a formula of $ArNR^1R^2$, where Ar is a substituted or unsubstituted aryl group and $R^1$ and $R^2$ are the same or different. $R^1$ and $R^2$ can be independently selected from H or an alkyl or aryl group containing from 1 to about 16 carbon atoms. Illustrative aromatic amines that can be suitable for use in the present embodiments include, for example, aniline, toluidine, anisidine, N,N-dimethylaniline, N,N-dimethylaniline, and the like. Other aromatic amines that can be used in conjunction with the embodiments described herein can be envisioned by one having ordinary skill in the art.

Suitable pyridines include both pyridine and its derivatives. Illustrative pyridines that can be suitable for use in the present embodiments include, for example, pyridine, 2-methylpyridine, 2,6-dimethylpyridine, collidine, pyridazine, and the like. Other pyridines that can be used in conjunction with the embodiments described herein can be envisioned by one having ordinary skill in the art.

Suitable phosphines can have a formula of $PR_3$, where R is an alkyl or aryl group containing from 1 to about 16 carbon atoms. The alkyl or aryl groups attached to the phosphorus center can be the same or different. Illustrative phosphines that can be used in the present embodiments include, for example, trimethylphosphine, triethylphosphine, tributylphophine, tri-t-butylphosphine, trioctylphosphine, triphenylphosphine, and the like. Phosphine oxides can also be used in a like manner. In some embodiments, surfactants that contain two or more phosphine groups configured for forming a chelate ring can also be used. Illustrative chelating phosphines can include 1,2-bisphosphines, 1,3-bisphosphines, and bis-phosphines such as BINAP, for example. Other phosphines that can be used in conjunction with the embodiments described herein can be envisioned by one having ordinary skill in the art.

Suitable thiols can have a formula of RSH, where R is an alkyl or aryl group having from about 4 to about 16 carbon atoms. Illustrative thiols that can be used in the present embodiments include, for example, butanethiol, 2-methyl-2-propanethiol, hexanethiol, octanethiol, benzenethiol, and the like. In some embodiments, surfactants that contain two or more thiol groups configured for forming a chelate ring can also be used. Illustrative chelating thiols can include, for example, 1,2-dithiols (e.g., 1,2-ethanethiol) and 1,3-dithiols (e.g., 1,3-propanethiol). Other thiols that can be used in conjunction with the embodiments described herein can be envisioned by one having ordinary skill in the art.

As described above, the nature of the metal that is present in the metal shell of the metal nanoparticles and how strongly it is desired that the surfactant is held to the metal shell can help determine whether a surfactant is suitable for use with a particular type of metal nanoparticles. For example, amine surfactants, including those noted above, associate strongly with transition metals and can be particularly advantageous in this regard. One or more amine surfactants may be particularly beneficial for the synthesis of copper nanoparticles, for example. In contrast, amine surfactants generally bind much less strongly to main group metals. Without being bound by any theory or mechanism, it is believed that main group metals are "softer" and are more strongly bonded by surfactants that prefer softer metal centers. In this regard, pyridines, aromatic amines, phosphines, and thiols can be more suitable surfactants for softer metal centers. One or more of these types of surfactants can be particularly beneficial in the synthesis of tin nanoparticles, for example. As described above, one or more aliphatic amines, including any aliphatic amine described above, can be used in combination with pyridines, aromatic amines, phosphines, and thiols to help further modulate the properties of the metal nanoparticles. Further, for making metal oxide nanoparticles, alcohol and carboxylic acid surfactants can be desirable.

In some embodiments, the at least one surfactant can include a first surfactant that contains a C6-C18 primary alkyamine and a second surfactant that contains a N,N'-dialkylethylenediamine, particularly a C1-C4 N,N'-dialkylethylenediamine. In further embodiments the at least one surfactant can further include a third surfactant that contains a secondary alkylamine, particularly a C4-C12 secondary alkylamine.

Reducing agents that can be reacted with the second metal salt in order to promote the formation of metal nanoparticles are not believed to be particularly limited, other than having the capability for reducing the second metal salt to form a zero-valent metal. In some embodiments, the reducing agent can be an alkali metal such as, for example, lithium, sodium, or potassium, in the presence of a suitable catalyst. In some embodiments, the reducing agent can be lithium naphthalide, sodium naphthalide, or potassium naphthalide. In other embodiments, the reducing agent can be sodium borohydride, lithium borohydride, a tetraalkylammonium borohydride, or a like borohydride reducing agent. In still other embodiments, the reducing agent can be ascorbic acid, citric acid, a hydroxylamine, a reducing sugar, an aldehyde, or $NaH_2PO_2$, for example. Additional reducing agents suitable for use in conjunction with forming metal nanoparticles can be envisioned by one having ordinary skill in the art.

In general, metal nanoparticles can be formed in the presence of a small excess of the reducing agent, typically about a 5% molar excess or above relative to the second metal salt, or about a 10% molar excess or above. Larger molar excesses of up to about a 100% molar excess can also be used, if desired. In some embodiments, up to about a 25% molar excess of the reducing agent can be used relative to the second metal salt. Lower amounts of the reducing agent can be used if the reaction mixture is maintained under dry conditions so as not to decompose excessive amounts of the reducing agent, particularly for those reducing agents that can be reactive with atmospheric moisture or admixed water.

In addition to the second metal salt, the nanoparticle seeds can, in some embodiments, be reduced by the reducing agent in concert with forming the metal shell around the nucleus. Thus, the nucleus of the nanoparticles formed by the methods described herein can, in some embodiments, also be metallic like the metal shell. However, in other embodiments, the nucleus can maintain a metal oxidation state of +1 or above. In the case of copper (I) nanoparticle seeds, the copper (I) is readily reduced, such that the nucleus becomes at least partially reduced to zero-valent copper upon reducing the second metal salt to form the metal shell around the nucleus. Reducing the nucleus to form a zero-valent metal in this manner advantageously avoids the introduction of significant anions (e.g., chloride anions) from the nanoparticle seeds into the metal nanoparticles. As described above, in some embodiments, the nanoparticle seeds can also become reacted, alloyed, or otherwise admixed with the metal shell in the course of forming the metal nanoparticles.

In some embodiments, the metal nanoparticles can be formed in a solvent that is substantially anhydrous (e.g., about 200 ppm water or lower). Suitable techniques for drying solvents will be familiar to one having ordinary skill in the art. Suitable solvents include those set forth hereinbelow.

In some embodiments, the nanoparticle seeds can be formed in a first solvent, and the reducing agent used to form the metal nanoparticles can be present in a second solvent, with the first solvent and the second solvent being combined to result in the formation of the metal nanoparticles. The first solvent and the second solvent in such embodiments can be the same or different. In some embodiments, the nanoparticle seeds and the metal particles can all be formed in the same reaction vessel.

In some embodiments, the solvent in which the metal nanoparticles are formed can be an organic solvent, particularly any polar aprotic solvent that is capable of at least partially solubilizing one or more metal salts and a reducing agent. As described above, in some embodiments, the organic solvent can be substantially anhydrous. Further, in some embodiments, the organic solvent can be substantially oxygen free. Suitable organic solvents for solubilizing metal salts and forming metal nanoparticles can include, for example, formamide, N,N-dimethylformamide, dimethyl sulfoxide, dimethylpropylene urea, hexamethylphosphoramide, tetrahydrofuran, and methyl or ethyl ethers of glyme, diglyme, triglyme, and tetraglyme. Diglyme or triglyme can be particularly advantageous, since they readily dissolve a number of metal salts while also activating reducing agents such as sodium borohydride. In some embodiments, the metal salt can be dissolved in a first solvent, and the reducing agent can be dissolved in triglyme, which is then combined with the first solvent. Approaches in which triglyme is used as the solvent can have a reducing agent concentration ranging between about 0.5 M and about 3 M, allowing small reaction volumes to be handled. In alternative embodiments, the solvent can include water as a component in an organic solvent, or water alone can be used as the solvent. Particularly, in some embodiments, the nanoparticle seeds can be formed from a water-based solvent.

In some embodiments, any of the metal salts used in the methods described herein can be dried by techniques such as, for example, heating under vacuum or reacting with a chemical drying agent such as, for example, an orthoester or thionyl chloride. Drying of the metal salts can help maintain the solvent in a substantially dry state in the event that an anhydrous solvent is used.

In some embodiments, formation of the metal nanoparticles can take place in a reduction that occurs at a temperature below about 100° C., or below about 80° C., or below about 50° C. In some embodiments, formation of the metal nanoparticles can take place at a temperature ranging between about 0° C. and about 50° C., or between about 25° C. and about 50° C., or between about 25° C. and about 80° C., or between about 30° C. and about 40° C. As one of ordinary skill in the art will appreciate, higher temperatures will generally facilitate the faster formation of metal nanoparticles. Further, one of ordinary skill in the art will appreciate that the size of the metal nanoparticles obtained may depend, at least in part, upon the temperature at which the metal nanoparticles are formed. Moreover, the length of time that the reduction is allowed to proceed can also influence the size of the metal nanoparticles formed. At lower temperatures, the reaction to form metal nanoparticles can be completed more slowly (several hours), whereas at higher temperatures a very rapid reaction can occur (a few minutes). In some embodiments, the reaction can take place over a period of about 1 to about 3 hours, and in other embodiments, the reaction can take place over a period as short as 1 minute. Relatively short reaction times can be desirable for industrial scale processes.

While reacting the reducing agent with the second metal salt, the reaction mixture can be monitored for signs of metal nanoparticle formation. These signs can include, for example, a change in color and/or gas evolution. Metal nanoparticle formation can also be monitored colorimetrically, photometrically, or potentiometrically, if desired.

Once a desired amount of reduction to form metal nanoparticles has taken place, the reaction can be stopped in various ways. In some embodiments, the reducing agent can be quenched with a terminating agent that is reactive with the reducing agent but not substantially reactive with the metal nanoparticles. Illustrative examples of terminating agents can include, for example, aldehydes, ketones, nitriles, organic acids, water, combinations thereof, and the like. More specific examples can include, for example, acetaldehyde, acetonitrile, formic acid, acetic acid, malic acid, and oxalic acid. One of ordinary skill in the art will recognize that by quenching the reducing agent, one can arrest the formation of metal nanoparticles. In some embodiments, the amount of the terminating agent can be chosen such that it is stoichiometrically equivalent with the amount of excess reducing agent.

In other embodiments, the formation of metal nanoparticles can be arrested by means other than or in combination with quenching of the reducing agent. For example, in some embodiments, the formation of metal nanoparticles can be arrested by cooling the reaction mixture to about −10° C. or below (e.g., in a liquid nitrogen or dry ice bath), centrifuging the reaction mixture, or combinations thereof. One of ordinary skill in the art will recognize that in the former case, lowering of the reaction temperature to this degree will effectively stop the reduction process. In the latter case, centrifuging the metal nanoparticles can remove them from the reaction mixture in which the reducing agent is present, thereby separating the metal nanoparticles from the excess reducing agent. In some embodiments, centrifuging the metal nanoparticles can take place at a reduced temperature (e.g., below room temperature) so as to minimize the risk of nanoparticle fusion occurring during the centrifugation process. For example, in some embodiments, centrifugation can take place at a temperature ranging between about −10° C. and about 15° C.

In some embodiments, the metal nanoparticles formed by the methods described herein can be used in situ without further isolation. In other embodiments, a work up of the reaction mixture can be performed to purify and isolate the metal nanoparticles. Isolation and purification of the metal nanoparticles can include a series of rinses, sonication, and centrifugation steps. After isolation of the metal nanoparticles from the reaction mixture, various purification processes can optionally be conducted. For example, after isolation of the metal nanoparticles by centrifugation, the mother liquor can be decanted, and the metal nanoparticles can be washed with glyme, THF, or a like solvent to remove excess reducing agent and potential organic side reaction products. Next, water washes can then be conducted until an $AgNO_3$ test of the wash water is negative for the presence of chloride, which typically takes about 1 to about 5 water washes. In some embodiments, aqueous ammonia washes of the metal nanoparticles can be conducted to remove any unreacted metal salt from the reaction mixture. In such embodiments, a ratio of about 1:4 to about 1:10 ammonia: water can most typically be used.

In some embodiments, after their preparation and isolation, the metal nanoparticles can be stored under conditions that facilitate their long term stability. In some embodiments, the metal nanoparticles can be stored under water or another solvent that contains an antioxidant such as, for example, citric acid, ascorbic acid, butylated hydroxyanisole (BHA), butylated hydroxytoluene (BHT), or propyl gallate (PG). In some embodiments, the metal nanoparticles can be stored under long chain hydrocarbons (e.g. mineral oil), high boiling petroleum ether and the like. In some embodiments, the metal nanoparticles can be stored by sealing a powder of metal nanoparticles with a wax layer and storing in a closed container. In some embodiments, the container housing the metal nanoparticles can be flushed with an inert gas such as nitrogen or argon before being sealed so as to further minimize the risk of oxidation during storage. In some embodiments, the storage container can be sealed with, for example, a wax layer, shrink wrap, tape, film, and the like.

In some embodiments, the metal nanoparticles can be dispersed in a material that prevents the metal nanoparticles from coming in contact with one another and optionally protects the metal nanoparticles from atmospheric oxygen during storage. Illustrative materials meeting these criteria can include, for example, waxes, long chain amines having greater than about 10 carbon atoms, paraffins, and aromatic compounds such as, for example, phenanthrene, pyrene, or anthracene.

In some embodiments, the metal nanoparticles can be mixed with an additive such that they have a desired consistency. For example, the metal nanoparticles can be formulated to produce the consistency of a gel, paste, paint or like material. In such embodiments, the metal nanoparticles can be formulated and readily applied to a surface. For example, in some embodiments, the metal nanoparticles can be used to form a connection on a surface (e.g., to join a first member to a second member). In some embodiments, the metal nanoparticles can be mixed with an additive such as, for example, dicyclohexylamine, paraffin wax, glycerin, or flux materials (e.g., formic acid, acetic acid, hexadecanoic acid, or triethanolamine) to attain a desired consistency. In some embodiments, small amounts of solvents such as, for example, ethanol, isopropanol, butanol, t-butanol, cyclohexanol, acetone, toluene and the like can be used to obtain a consistency suitable for ready application to a surface. In some embodiments, a solution or suspension of the metal nanoparticles can be partially evaporated to remove at least some of the solvent therefrom to attain a desired consistency. When formulated as a gel, paste, paint or the like, about 75% to about 98% metal nanoparticles by weight are usually present, with the balance being solvent and/or additives used to attain the desired consistency. However, for these applications and others, nanoparticle concentrations even as low as about 50% by weight can be used. Particularly suitable additives and combinations thereof for dispensing metal nanoparticles can include those described in commonly owned U.S. patent application Ser. No. 13/764,669, filed on Feb. 11, 2013 and incorporated herein by reference in its entirety.

In alternative embodiments, the insoluble compound constituting the nanoparticle seeds can be converted directly to metal nanoparticles. Specifically, in some embodiments, methods for forming metal nanoparticles can include reacting the nanoparticle seeds with a reducing agent in the presence of at least one surfactant in order to form the metal nanoparticles. In some embodiments, a copper (I) nanoparticle seed can be directly reduced to form copper nanoparticles. In some embodiments, methods for forming copper nanoparticles can include providing a copper (II) salt in a solvent; reducing the copper (II) salt to form an insoluble copper (I) salt having a particle size of about 10 nm or less; after forming the insoluble copper (I) salt, adding at least one surfactant and a reducing agent thereto; and reacting the reducing agent with the insoluble copper (I) salt in the presence of the at least one surfactant to form a plurality of copper nanoparticles. Other metal nanoparticles can be synthesized similarly. The conversion of nanoparticle seeds to metal nanoparticles in this manner can advantageously take place without an increase in size relative to that of the nanoparticle seeds. The uniqueness of this approach is that copper is not being reduced from a solution, as in other processes described herein, but instead from a suspension or sol of nanoparticle seeds.

In some embodiments, compositions containing metal nanoparticles are described herein. In various embodiments, the metal nanoparticles can have a metal shell formed around a nucleus. The nucleus can be derived from an insoluble compound that is produced as described above. In some embodiments, the nucleus can contain a metal that is different than the metal shell surrounding it. In other embodiments, the nucleus can contain the same metal as the metal shell. Illustrative metals that can be present in the metal shell include transition metals (Sc, Ti, V, Cr, Mn, Fe, Co, Ni, Cu, Zn, Y, Zr, Nb, Mo, Ru, Rh, Pd, Ag, Cd, Hf, Ta, W, Re, Os, Ir, Pt, Au), main group metals (e.g., Al, Ga, In, Tl, Sn, Pb, Sb, Bi), and lanthanide metals (La, Ce, Pr, Nd, Sm, Eu, Gd, Tb, Dy, Ho, Er, Tm, Yb, Lu). The metal nanoparticles can be formed by the processes described hereinabove.

In more particular embodiments, the metal nanoparticles can contain a nucleus derived from a copper (I) salt. That is, the nanoparticle seeds can be formed from a copper (I) salt such as, for example, copper (I) chloride, copper (I) bromide, or copper (I) iodide, and the copper (I) nanoparticle seeds can be subsequently converted during the formation of metal nanoparticles. In such cases, suitable copper (II) salts used for forming the copper (I) nanoparticle seeds can include copper (II) chloride, copper (II) bromide, or copper (II) iodide. Suitable copper (II) salts are not limited to halides and can also include other copper (II) salts such as, for example, copper (II) sulfate, copper (II) acetate, copper (II) nitrate, and the like. In other embodiments, the metal nanoparticles can contain a nucleus formed from an iron compound, a silver compound or a gold compound. In still other embodiments, the metal nanoparticles can contain a nucleus formed from $Cu_2O$. In the case of silver and gold, the nucleus can already be in a metallic state prior to formation of a metal shell around it. When not already in a metallic state, the nanoparticle seeds can be reduced to a metallic state while forming the metal shell around the nucleus. As described above, other substances can also form the nucleus of the metal nanoparticles described herein.

In some embodiments, the metal nanoparticles can be about 30 nm or less in size, or about 20 nm or less in size, or about 10 nm or less in size, or about 5 nm or less in size. In some embodiments, the metal nanoparticles can range between about 0.1 nm and about 30 nm in size, or between about 0.5 nm and about 5 nm in size, or between about 1 nm and about 10 nm in size, or between about 5 nm and about 20 nm in size. In some embodiments, the metal nanoparticles can range between about 0.5 nm and about 6 nm in size, or between about 1 nm and about 6 nm in size, or between about 3 nm and about 6 nm in size, or between about 3 nm and about 5 nm in size, or between about 2 nm and about 6 nm in size.

In some embodiments, mixtures of metal nanoparticles having different size distributions can be used in the compositions described herein. Specifically, in some embodiments, mixtures of metal nanoparticles can have a first plurality of metal nanoparticles having a first size range and a first average size and a second plurality of metal nanoparticles having a second size range and a second average size. In some embodiments, the mixture of metal nanoparticles can have a bimodal size distribution. For example, in some embodiments, metal nanoparticles having sizes ranging between about 0.5 nm and about 5 nm can be mixed with metal nanoparticles having sizes ranging between about 10 nm and about 25 nm. Given the benefit of the present disclosure, one of ordinary skill in the art will be able to determine whether a single population of metal nanoparticles or mixture of metal nanoparticles having different sizes is best suited for a given application. For example, a mixture of metal nanoparticles having different fusion temperatures can be used when it is desired to liquefy only a portion of the metal nanoparticles.

Metal nanoparticles produced by the techniques described herein can be used in a number of applications. In some embodiments, the metal nanoparticles can be used in soldering applications. More particularly, the metal nanoparticles can be applied to a substrate and then at least partially fused together to join two or more surfaces together. In some or other embodiments, the metal nanoparticles can be used in applications such as printed circuit boards (PCBs), conformal coatings, thin film solar cells, batteries, drug delivery and drug therapy systems, thermoelectric materials, gas sensors, conductive inks, and the like.

EXAMPLES

Tin nanoparticle syntheses (Examples 1 and 2) were carried out under inert gas atmosphere, and all solvents and surfactants were degassed with dry argon or nitrogen gas for 5 minutes before use.

Example 1

40 ml of water was placed into a 100 mL 3 neck round bottom flask, which was then evacuated and backfilled with argon three times. Thereafter, 0.5 g of copper (II) chloride dihydrate was added, and the mixture was stirred for 30 minutes at room temperature until completely dissolved. A 50 mL aqueous solution containing 2.5 g of tin (II) chloride dihydrate was then added rapidly to the copper (II) chloride solution. The reaction mixture turned opaque immediately due to the formation of copper (I) chloride seeds (see FIG. 3A). To the copper (I) chloride seeds, the following surfactants were added under positive argon pressure: 2 mL of n-butylamine or t-butylamine and 3 mL of pyridine.

A 50 mL round bottom flask was charged with 12 mL of basic (0.5 mL n-butylamine) 2.0 M sodium borohydride solution. While keeping both flasks at room temperature, the sodium borohydride solution was transferred to the flask containing the copper (I) chloride seeds over no more than 30 seconds using a cannula or syringe. The reaction mixture immediately turned black and evolved gas. Once the reaction was complete, as evidenced by the cessation of gas evolution, the reaction mixture was cooled to 0° C. in an ice bath for 10 minutes. The reaction mixture was centrifuged at 2200 RPM for 10 minutes, resulting in a black precipitate and a clear supernatant. The black precipitate was washed with a dicyclohexylamine (4 mL)/water mixture (40 mL). The mixture was again centrifuged at 2200 RPM for 10 minutes, resulting in a black to grey precipitate and clear supernatant. The solid was then stored in a closed container under argon.

Example 2

75 mL of triglyme was placed in a 100 mL 3-neck round bottom flask, which was then evacuated and backfilled with argon three times. Thereafter, 0.5 g of anhydrous copper (II) chloride was added, followed by the following surfactants under positive argon pressure: 2 mL of n-butylamine and 3 mL of pyridine. The reaction mixture was stirred for 1 hour at 45° C. until the solids were completely dissolved. Thereafter, 2.5 g of $SnCl_4$ was added, followed rapidly by 20 mL of a triglyme solution containing 0.5 g of dissolved glucose. The reaction mixture turned opaque due to the formation of the nanoparticle seeds.

A 50 mL round bottom flask was charged with 25 mL of dry 2.0 M sodium borohydride solution in triglyme. While keeping both flasks at 45° C., the sodium borohydride solution was transferred to the flask containing the seeded tin (IV) chloride solution over no more than 30 seconds using a cannula. The reaction mixture immediately turned black and evolved gas. Once the reaction was complete, as evidenced by the cessation of gas evolution, the reaction mixture was cooled to 0° C. in an ice bath for 10 minutes. The reaction mixture was centrifuged at 2200 RPM for 10 minutes, resulting in a black precipitate and a clear supernatant. The black precipitate was washed with a dicyclohexylamine (4 mL)/water mixture (40 mL). The mixture was again centrifuged at 2200 RPM for 10 minutes, resulting in a black to grey precipitate and clear supernatant. The solid was then stored in a closed container under argon.

Example 3

230 mL of triglyme was placed in a 500 mL 3-neck round bottom flask, which was then evacuated and backfilled with argon three times. Thereafter, 4 g of anhydrous copper (II) chloride was added, followed by the following surfactants under positive argon pressure: 12 mL of t-octylamine and 20 mL diisobutylamine. The reaction mixture was then stirred at 42° C. until the solids were completely dissolved. 15 mL N,N'-di-t-butylethylenediamine was then added, and the reaction mixture turned opaque with the formation of nanoparticle seeds in the form of an insoluble ligand complex.

Copper nanoparticles were then formed directly from the nanoparticle seeds. A 100 mL round bottom flask was charged with 50 mL of dry 2.8 M sodium borohydride solution in triglyme. The sodium borohydride solution was transferred to the flask containing the nanoparticle seeds over no more than 30 seconds using a cannula. The reaction mixture turned black and evolved gas over the next 5-10 minutes. Once the reaction was complete, as evidenced by the cessation of gas evolution, the reaction mixture was cooled to 0° C. in an ice bath for 10 minutes. The reaction mixture was centrifuged at 2200 RPM for 10 minutes, resulting in a black precipitate and a clear supernatant. The black precipitate was then washed with a hexylamine/water mixture (4 mL/40 mL). The mixture was again centrifuged at 2200 RPM for 10 minutes, resulting in a clear supernatant and a dark brown precipitate with a copper sheen. The solid was collected and stored in a closed container under argon.

Example 4

230 mL of triglyme was placed in a 500 mL 3-neck round bottom flask, which was then evacuated and backfilled with argon three times. Thereafter, 3 g of anhydrous silver (I) nitrate and 12 mL N,N'-di-t-butylethylenediamine were added under positive argon pressure. The reaction mixture was then stirred until the solids were completely dissolved. Thereafter, 10 mL of benzoic acid was added, upon which the reaction mixture turned opaque with the formation of nanoparticle seeds.

Silver nanoparticles were then formed directly from the nanoparticle seeds. A 100 mL round bottom flask was charged with 20 mL of dry 2.8 M sodium borohydride solution in triglyme. The sodium borohydride solution was transferred to the flask containing the nanoparticle seeds over no more than 30 seconds using a cannula. The reaction mixture turned black and evolved gas over the next 2-3 minutes. Once the reaction was complete, as evidenced by the cessation of gas evolution, the reaction mixture was cooled to 5° C. in an ice bath for 10 minutes. The reaction mixture was then centrifuged at 2200 RPM for 7 minutes, resulting in a black precipitate and a clear supernatant. The black precipitate was washed with a hexylamine/water mixture (4 mL/40 mL). The mixture was again centrifuged at 2200 RPM for 7 minutes, resulting in a black precipitate and clear supernatant. The solid was then collected and stored in a closed container under argon.

Example 5

0.07 g dry bismuth (III) chloride and 0.05 g dry sodium telluride were placed in separate 100 mL 3-neck round bottom flasks, each containing 50 mL of methanol, and dissolved in the solvent. Thereafter, the solutions were cooled to −20° C. using a standard chiller and then combined by cannulating them simultaneously into a third 500 mL 3-neck round bottom flask containing 25 mL of ethanol, also at −20° C. Upon warming to 0° C., a dark, opaque mixture of nanoparticle seeds formed.

To the nanoparticle seeds, the following two solutions were added simultaneously at 0° C.: one containing 0.7 g lanthanum chloride in 50 mL ethanol and the other containing 0.5 g of sodium telluride in 50 mL ethanol. After slowly warming to room temperature, the reaction mixture turned black. Thereafter, 20 mL of diethyleneglycol diethylether was added. The reaction mixture was then centrifuged at 2200 RPM for 7 minutes, resulting in a black precipitate and a clear supernatant. The black precipitate was washed with a diglyme/water mixture (4 mL/40 mL). The mixture was again centrifuged at 2200 RPM for 7 minutes, resulting in a black to grey precipitate and clear supernatant. The solid was then collected and stored in a closed container under argon.

Although the invention has been described with reference to the disclosed embodiments, those skilled in the art will readily appreciate that these only illustrative of the invention. It should be understood that various modifications can be made without departing from the spirit of the invention. The invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is the following:

1. A metal nanoparticle composition comprising:
   metal nanoparticles comprising a metal shell containing a first metal formed around a nucleus comprising a copper (I) salt nanoparticle seed for deriving a second metal; and
   a surfactant coating disposed on the metal shell, the surfactant coating comprising at least one surfactant, wherein the first metal and the second metal are different.

2. The metal nanoparticle composition of claim 1, wherein the at least one surfactant comprises a first surfactant comprising a C6-C18 primary alkylamine and a second surfactant comprising an N,N'-dialkylethylenediamine.

3. The metal nanoparticle composition of claim 1, wherein the metal nanoparticles range from about 1 nm to about 10 nm in size.

4. The metal nanoparticle composition of claim 1, wherein the first metal is selected from the group consisting of Sc, Ti, V, Cr, Mn, Fe, Co, Ni, Zn, Y, Zr, Nb, Mo, Ru, Rh, Pd, Ag, Cd, Hf, Ta, W, Re, Os, Ir, Pt, Au, Al, Ga, In, Tl, Sn, Pb, Sb, Bi, La, Ce, Pr, Nd, Sm, Eu, Gd, Tb, Dy, Ho, Er, Tm, Yb, and Lu.

* * * * *